(12) United States Patent
Murshid

(10) Patent No.: US 6,801,678 B2
(45) Date of Patent: Oct. 5, 2004

(54) FIBER OPTIC LEVEL DETECTOR

(75) Inventor: Syed H. Murshid, Melbourne, FL (US)

(73) Assignee: Florida Institute of Technology, Melbourne, FL (US)

( * ) Notice: Subject to any disclaimer, the term of this patent is extended or adjusted under 35 U.S.C. 154(b) by 0 days.

(21) Appl. No.: 10/640,800

(22) Filed: Aug. 13, 2003

(65) Prior Publication Data
US 2004/0036043 A1 Feb. 26, 2004

Related U.S. Application Data

(60) Provisional application No. 60/403,860, filed on Aug. 15, 2002.

(51) Int. Cl.$^7$ .............................. G02B 6/00; G01N 21/85
(52) U.S. Cl. .................. 385/12; 250/577; 250/227.14; 250/901
(58) Field of Search .................. 385/12; 250/227.14, 250/577, 227.25, 573, 576, 901, 227

(56) References Cited

U.S. PATENT DOCUMENTS 4,880,971 A * 11/1989 Danisch ...................... 340/619
4,942,306 A    7/1990 Colbourne

* cited by examiner

*Primary Examiner*—Frank G. Font
*Assistant Examiner*—Michael P. Mooney
(74) *Attorney, Agent, or Firm*—William M. Hobby, III

(57) ABSTRACT

A fiber optic liquid level detector uses optical fibers to detect the presence or absence of liquids. The waveguide properties of optical fibers tends to deviate from the normal dielectric interfaces so that a fiber immersed in a liquid has a reflection coefficient smaller than when surrounded by air. This is caused by the differences in refractive indices of liquid and air and is used to measure the amount of light transmitted or reflected by the fiber in the preserve or absence of a liquid.

8 Claims, 2 Drawing Sheets

FIBER OPTIC LEVEL DETECTOR

This application claims the benefit of Provisional Application No. 60/403,860, filed Aug. 15, 2002.

BACKGROUND OF THE INVENTION

This invention relates to a liquid level detection system and especially to a liquid level detection system in which optical fibers are used to detect the presence or absence of fluids.

Conventionally, the level of a liquid in a vessel is detected by using a float with a mechanical or magnetic coupling to an external gauge, an ultrasonic or optical transducer which measures time of flight to deduce the liquid level, or a parallel wire capacitance sensor which monitors the change in the dielectric constant between the wires associated with a change in liquid level.

The application of fiber optics to level sensing in liquids is well documented. The principal advantages of this type of level sensor are its passivity, i.e. no moving or mechanical parts, and its intrinsic dielectric properties which mean no spark hazard when used with combustible fluids and virtually zero susceptibility to electromagnetic interference. The more common implementations use small prisms mounted at the end of two optical fibers, a conically shaped optical fiber tip, or a U-shaped bent optical fiber. In all instances, the optical fiber probe or sensor is suspended or made to protrude into the vessel, and the potentially fragile sensor is exposed to damage by floating debris, vibration and dynamic effects during filling. The potential for damage is increased if routine maintenance of the sensor is required due to biological or chemical fouling of the optical surface.

The fiber optic sensors just described are primarily for discrete level measurement, e.g. to sense whether the vessel is empty or full or at some intermediate point. A multiplicity of such point sensors generally represents an impractical configuration for a continuous liquid level measure. A continuous measure is desirable, however, for improved resolution in many applications. Consider the case of an aircraft fuel gauge. The dielectric properties of the optical fiber sensor are desirable from the point of view of safety with respect to spark hazard and lightning strikes but high resolution and accuracy are also desirable so that excess fuel quantities would not have to be carried thus reducing aircraft weight and consequently fuel consumption. Present day aircraft fuel level sensors are for the most part capacitance type sensors which lose accuracy when the fuel becomes laden with water and the dielectric constant is changed significantly.

One prior art continuous fiber optic liquid level sensor is based on the bending or cladding loss principle, it consists of large loops of a single fiber, the loops being of ever increasing diameter, which are suspended in the liquid.

Another such sensor teaches a fluorescent doped detector fiber to collect light reflected from a source fiber in the presence of air. The light is refracted away when a fluid of higher refractive index. Hence, the output signal is analogous to the fluid level.

Yet another such sensor can be seen in U.S. Pat. No. 4,942,306 and uses two optical fibers, a source is transmitted into an optical fiber having one end adapted to be optically connected to an external light source, and a detector or receive optical fiber having one end adapted to be optically connected to an external light detector. The source optical fiber has at least the other end thereof embedded in an optically clear substrate material or window that is in contact with the liquid to be sensed such that the light exiting the source fiber is incident on the substrate to liquid or air interface at an angle between the critical angle for the liquid and the critical angle for air. The substrate or window material has a refractive index equal or nearly equal to that of the core of the optical fiber so that the maximum refractive index mismatch will occur at the interface to the liquid. A fluorescent detector fiber is mounted within the substrate so that it can receive any light from the source which is internally reflected from the interface. Hence, a received light signal will occur at the external light detector only when a portion of the sensor is exposed to air.

SUMMARY OF THE INVENTION

A fiber optic liquid level detector uses optical fibers to detect the presence or absence of liquids. The waveguide properties of optical fibers tend to deviate from the normal at dielectric interfaces so that a fiber optic probe whose tip is immersed in a liquid has a reflection coefficient smaller than when surrounded by air or vacuum. This is caused by the differences in refractive indices of liquid and air and is used to measure the amount of light transmitted or reflected by the fiber in the presence or absence of a liquid. A fiber optic coupler is connected to a light source from a first fiber optic line and is connected to a light detector from a second fiber optic line. A fiber optic probe is connected to the fiber optic coupler for insertion into a liquid to be detected, where only the unconnected end of the probe is sensitive to the presence or absence of fluid. A signal processor is connected to the light detector for determining the deviation of the reflected light at the dielectric interface between the liquid being detected and the atmosphere adjacent the liquid. Liquid level is measured by detecting the presence or absence of liquid, resulting from a chancre in reflective coefficient(s), using one or more fiber optic probes positioned at specific levels. A plurality of fiber optic probes are utilized for measuring a plurality of fluid levels and can be coupled to a plurality of fiber optic couplers. The signal processor can be coupled to an LED display or other displays or devices for displaying a liquid level, and/or for initiating a process event or events. Said signal processor may be a comparator circuit to compare the detector output to any desired threshold value to initiate such aforementioned displays and/or process events.

BRIEF DESCRIPTION OF THE DRAWINGS

Other objects, features, and advantages of the present invention will be apparent from the written description and the drawings in which.

DESCRIPTION OF THE PREFERRED EMBODIMENT

The wave-guiding properties of fibers tend to deviate from the normal at dielectric interface, especially in reflection and transmission properties, depending on the surrounding medium that the fibers are contacting. Fresnel's equations explain transmission and reflection properties of light incident at the interface of two dielectric mediums. If a fiber is immersed in fluid, the reflection coefficient is smaller than that of air. The opposite is true for transmitted intensity. This is caused by the differences in refractive indices of fluid and air so that the fluid level in a tank can be determined by measuring the amount of light transmitted or reflected by the fiber in the presence or absence of a target fluid. This system is especially useful with explosive fluids. In general, a fire and explosion can be caused due to malfunction of an electronic sensor but this fiber optic sensor is immune to such dangers as only light and passive optical fiber cables come in contact with the liquid being measured.

Figure 1:
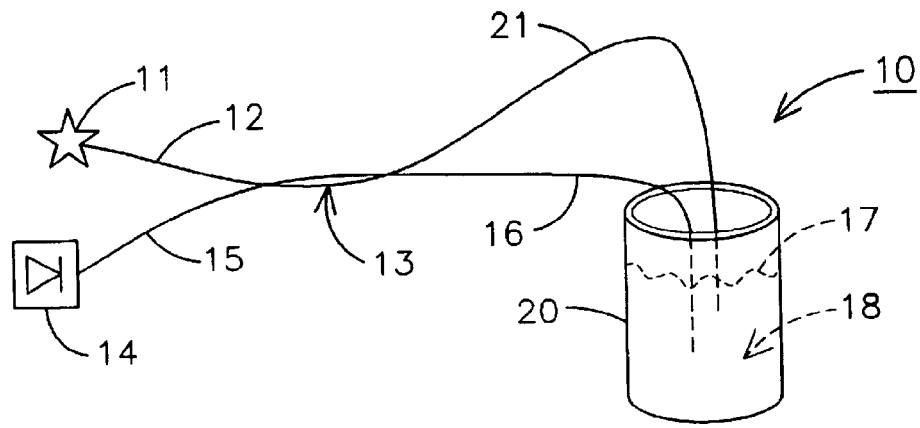
FIG. 1 is a diagrammatic view of a liquid level detection system.

Referring to FIG. 1 of the drawings, a schematic diagram of a discrete liquid sensor system 10 is illustrated and uses a Fresnel reflection mode liquid level sensor in which part of the transmitted light reflects back at interface boundaries where the refractive indexes are different between the measurand and silica fiber where nearly four percent of the total light reflects back at the glass air interface. In the basic system of FIG. 1, an LED source 11 launches light into the arm 12 of a 2×2 fiber coupler 13. A pin diode 14 is connected at the end of arm 15 extending from the coupler 13 for detection of the sensing signal. The sensor system is employed in the reflection mode instead of transmission mode and reflection from the output ends 16 and 21 of the coupler 13 are measured to detect the fluid level 17 of a fluid 18 in a tank 20. The system 10 forces light from the LED 11 to split into two light beams while traveling down the two output ends 16 and 21 from the 2×2 coupler 13. When light reaches the end of the fibers, most of it is transmitted to the interface medium with only a small fraction of the total optical power being reflected back towards the detector 14. The intensity of the reflection received at the detector 14 is a function of the difference between the refractive indices of the optical fiber and the interface medium. The amount of reflection can be calculated by Fresnel's equations. Two distinct reflection levels are seen by the detector 14 depending on the presence and absence of a fluid at the end of the fibers probe ties 16 and 21. This distinction in the reflection coefficients owes to the differences in the refractive indices at the fiber to environment interface due to presence or absence of a target fluid at the interface. It should be understood that a 2×2 coupler is a specific embodiment of the invention. In its simplest form only one output end or probe, such as 16 or 21, is required. The number of probes is limited only by practical design considerations.

Figure 2:
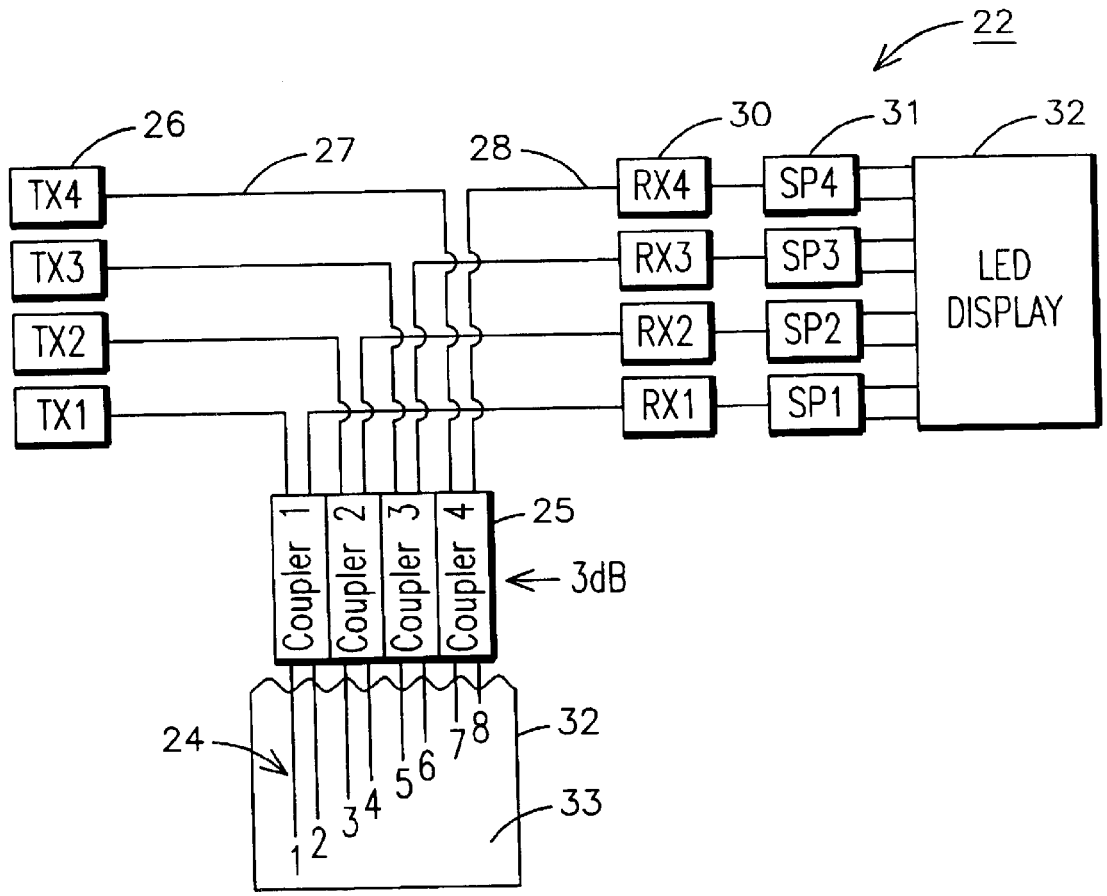
FIG. 2 is block diagram of a liquid level detection system having a plurality of probes.

This reflection mode liquid level sensing system can be used as a quasi-continuous liquid propellant level detection system 22, as seen in FIG. 2. The total height of the tank 23 is divided into eight equally spaced intervals having eight fiber optic sensors 24 extending at different levels thereinto. Each pair of fiber optics 24 is attached to one of the 2×2 couplers 25. Each coupler 25 has one transmitter 26 attached to the input fibers 27 for one particular coupler 25. Each optical fiber 28 is also attached to one 2×2 coupler 25 and connects to a receiver 30 which in turn is connected to a signal processor 31 and then to an LED display 32. The couplers 25 can be housed in a remote location as desired and standard communications grade optical fiber cable placed in the fluid tank 23 in contact with the measurand 33 in the tank 23. This system leads to a versatile sensing scheme that is small in size, inexpensive, lightweight, highly reliable, and almost universal in application and is adaptable to any surface and system. Simple optical transmitter and receiver circuits can be coupled with negligible signal processing and minimal power to form the circuit. The design uses four 2×2 multimode couplers 25 but it will be clear that 2×4 and 2×8 couplers with multiplexing techniques can also be utilized.

Figure 3:
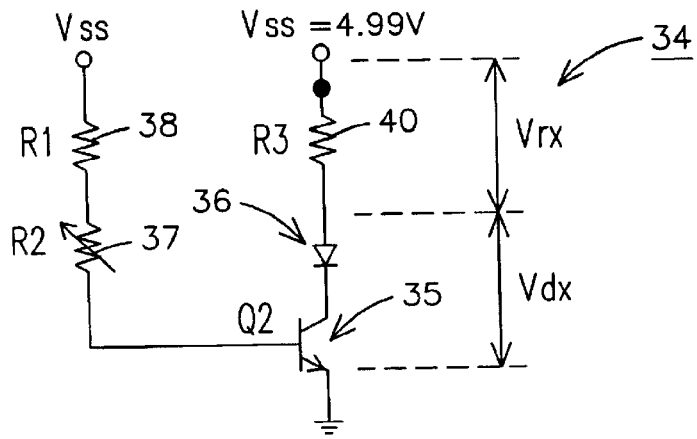
FIG. 3 is a schematic view of the transmitter circuit.

The transmitter circuit 26 is illustrated in FIG. 3 which can provide a threshold adjustment for the detection system and uses a simple transistor (2N2222) circuit 34 driving an infrared LED (OPF-692) 36. The transmitter circuit 34 with a transistor 35 and infrared LED 36 also has a variable resistor 37 and fixed resistors 38 and 40.

Figure 4:
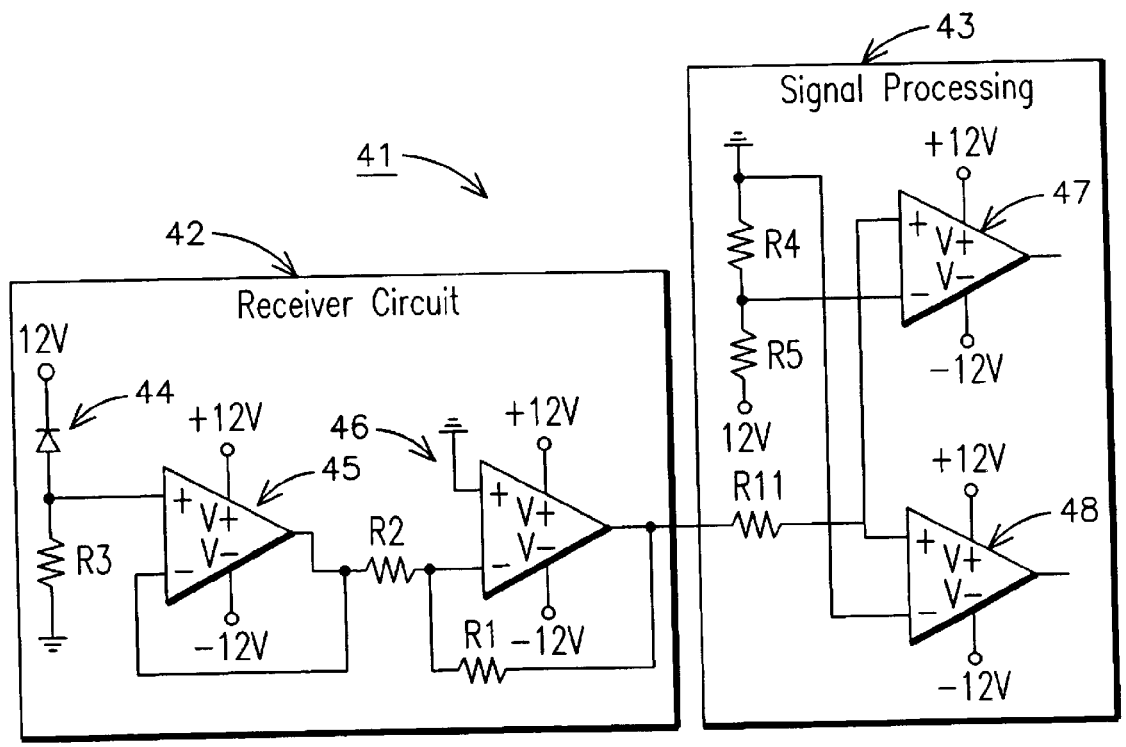
FIG. 4 is a schematic diagram of a single detection processing circuit.

FIG. 4 is a schematic diagram of a signal detection processing circuit 41 having a receiver circuit 42 and a signal processing circuit 43. The optical receiver circuit 42 utilizes a pin photo diode 44 (OPF-782) connected to a pair of Op-amps 45 and 46. One of the Op-amps behaves as a non-inverting buffer while the second one acts as an inverting amplifier. The output of the second amplifier 46 is fed to a signal processing circuit 43 that basically works as a comparator. The output signal from the receiver circuit is compared to a predetermined threshold. The threshold level is adjustable so that the decision making circuity can be tuned to any desired level. The signal processing circuit is also shown having a pair of Op-amps 47 and 48 connected to act as a comparator circuit. The actual sensing of the presence or absence of a target fluid is achieved at the fiber environment interface so that the actual sensor is nothing but a standard multimode or single mode communications fiber which can be readily applied to almost any sensing location. Eight fibers connected to a graduated scale are illustrated but it will, of course, be clear that any number of sensing fibers can be utilized without departing from the spirit and scope of the invention.

The sensor of the present invention can also be used for differentiating between different liquids by looking at the reflections caused by the differences in the refractive indices and can also be used to determine different concentrations of solvents within the same liquid. The sensor can also be used to determine other process parameters, such as temperature, where the refractive index of any given fluid varies with the process, resulting in a different reflection coefficient.

It should be clear at this time that a discrete liquid level sensor system has been provided which can be utilized for a wide variety of liquids including without limitation water, liquid propellants, liquid hydrogen, liquid oxygen, liquid nitrogen, toxic fluids, alcohols, oils, kerosene and petroleum products.

However, the present invention should not be construed as limited to the forms shown which are to be considered illustrative rather than restrictive.

I claim:

1. A fiber optic liquid detector comprising:

a fiber optic coupler;

a first fiber optic line connected between a light source and said fiber optic coupler;

a second fiber optic line connected between a light detector and said fiber optic coupler;

at least one fiber optic probe connected to said fiber optic coupler for insertion into a liquid to be detected; and a signal processor connected to said second fiber optic line light detector for determining the deviation of the reflective light at the dielectric interface between the liquid being detected and the atmosphere adjacent the liquid whereby the presence or absence of liquid is determined by the differences in refractive indices of the fluids surrounding said fiber optic probe.

2. A fiber optic liquid level detector in accordance with claim 1 having a plurality of fiber optic probes of different lengths for measuring liquid level, each said probe measuring the presence or absence of a liquid.

3. The fiber optic liquid level detector in accordance with claim 2 having a plurality of fiber optic couplers, each having at least one fiber optic probe for measuring liquid level.

4. The fiber optic liquid level detector in accordance with claim 2 having a plurality of fiber optic couplers, each coupler coupling a plurality of fiber optic probes for measuring a liquid level.

5. The fiber optic liquid level detector in accordance with claim 3 having a plurality of signal processors, one for each light detector for measuring a plurality of liquid level.

6. The fiber optic liquid level detector in accordance with claim 2 having said signal processor coupled to an LED display for displaying a liquid level.

7. The fiber optic liquid level detector in accordance with claim 2 in which said display is an LED display.

8. The fiber optic liquid level detector in accordance with claim 2 in which said signal processor is a comparator circuit comparing the detector output from said second fiber optic line to a predetermined threshold valve.

* * * * *